United States Patent
Liang

[11] Patent Number: 5,887,830
[45] Date of Patent: Mar. 30, 1999

[54] SPOON HOLDER DEVICE

[76] Inventor: Jui-Chang Liang, 58, Ma Yuan West St., Taichung, Taiwan

[21] Appl. No.: 911,113

[22] Filed: Aug. 14, 1997

[51] Int. Cl.[6] .................................................. A47G 21/14
[52] U.S. Cl. .................... 248/37.6; 211/70.9; 248/205.3; 248/316.7
[58] Field of Search ................................. 248/37.3, 37.6, 248/74.2, 205.3, 316.7, 909; 211/70.9

[56] References Cited

U.S. PATENT DOCUMENTS

| | | | |
|---|---|---|---|
| 1,472,995 | 11/1923 | Simone | 248/37.6 |
| 1,657,968 | 1/1928 | Linsemeyer | 248/37.3 |
| 1,991,364 | 2/1935 | Matter | 248/37.6 |
| 2,210,216 | 8/1940 | Putnoky | 248/37.6 X |
| 3,294,224 | 12/1966 | Laughlin | 248/316.7 X |
| 3,491,971 | 1/1970 | Fisher | 248/74.2 X |
| 4,632,347 | 12/1986 | Jurgich | 248/213.2 |
| 5,361,950 | 11/1994 | Signal et al. | 248/311.2 X |
| 5,645,252 | 7/1997 | Fisher | 248/74.2 |
| 5,678,790 | 10/1997 | Dwyer | 248/37.3 X |

*Primary Examiner*—Derek J. Berger

[57] ABSTRACT

A spoon holder device has a seat, an adhesive layer adhered on a bottom portion of the seat, and a curved clamp plate disposed on a top portion of the seat. One end of the curved clamp plate is attached to the seat. A plurality of block rods are disposed on the curved clamp plate in parallel. A spacing is defined between the seat and the curved clamp plate.

1 Claim, 8 Drawing Sheets

SPOON HOLDER DEVICE

BACKGROUND OF THE INVENTION

The present invention relates to a spoon holder device. More particularly, the present invention relates to a spoon holder device which can hold a spoon stably.

A powdered milk spoon is often burried in milk powders. The user may use fingers to find the powdered milk spoon. However, the fingers of the user may contaminate the milk powders. If the powdered milk spoon is placed outside a powdered milk can, the powdered milk spoon will be contaminated by the dust.

SUMMARY OF THE INVENTION

An object of the present invention is to provide a spoon holder device which can hold a spoon stably.

In accordance with a first embodiment of the present invention, a spoon holder device comprises a seat, an adhesive layer adhered on a bottom portion of the seat, and a curved clamp plate disposed on a top portion of the seat. One end of the curved clamp plate is attached to the seat. A plurality of block rods are disposed on the curved clamp plate in parallel. A spacing is defined between the seat and the curved clamp plate.

In accordance with a second embodiment of the present invention, a spoon holder device comprises a seat, an adhesive layer adhered on a bottom portion of the seat, and a curved clamp plate disposed on a top portion of the seat. One end of the curved clamp plate is attached to the seat. A plurality of block rods are disposed on the curved clamp plate in parallel. A spacing is defined between the seat and the curved clamp plate. A dust-resisting casing extends upward from the seat. The dust-resisting casing covers a head portion of the spoon. The seat has a plurality of parallel grooves.

In accordance with a third embodiment of the present invention, a spoon holder device comprises a seat, an adhesive layer adhered on a bottom portion of the seat, and a curved clamp plate disposed on a top portion of the seat. One end of the curved clamp plate is attached to the seat. A plurality of block rods are disposed on the curved clamp plate in parallel. A spacing is defined between the seat and the curved clamp plate. A dust-resisting casing extends upward from the seat. The dust-resisting casing covers a head portion of a spoon. The seat has a plurality of parallel grooves. An extended rod extends from the seat. The dust-resisting casing has a movable casing and an outer casing surrounding the movable casing. The movable casing is disposed on the seat. A first end of the outer casing is disposed on the seat. A second end of the outer casing is disposed on a distal end of the extended rod. A push bar is disposed on the movable casing. A slot is formed on the outer casing to receive the push bar.

BRIEF DESCRIPTION OF THE DRAWINGS

FIG. 7A is another sectional view of a dust-resisting casing; an

DETAILED DESCRIPTION OF THE INVENTION

Figure 1:
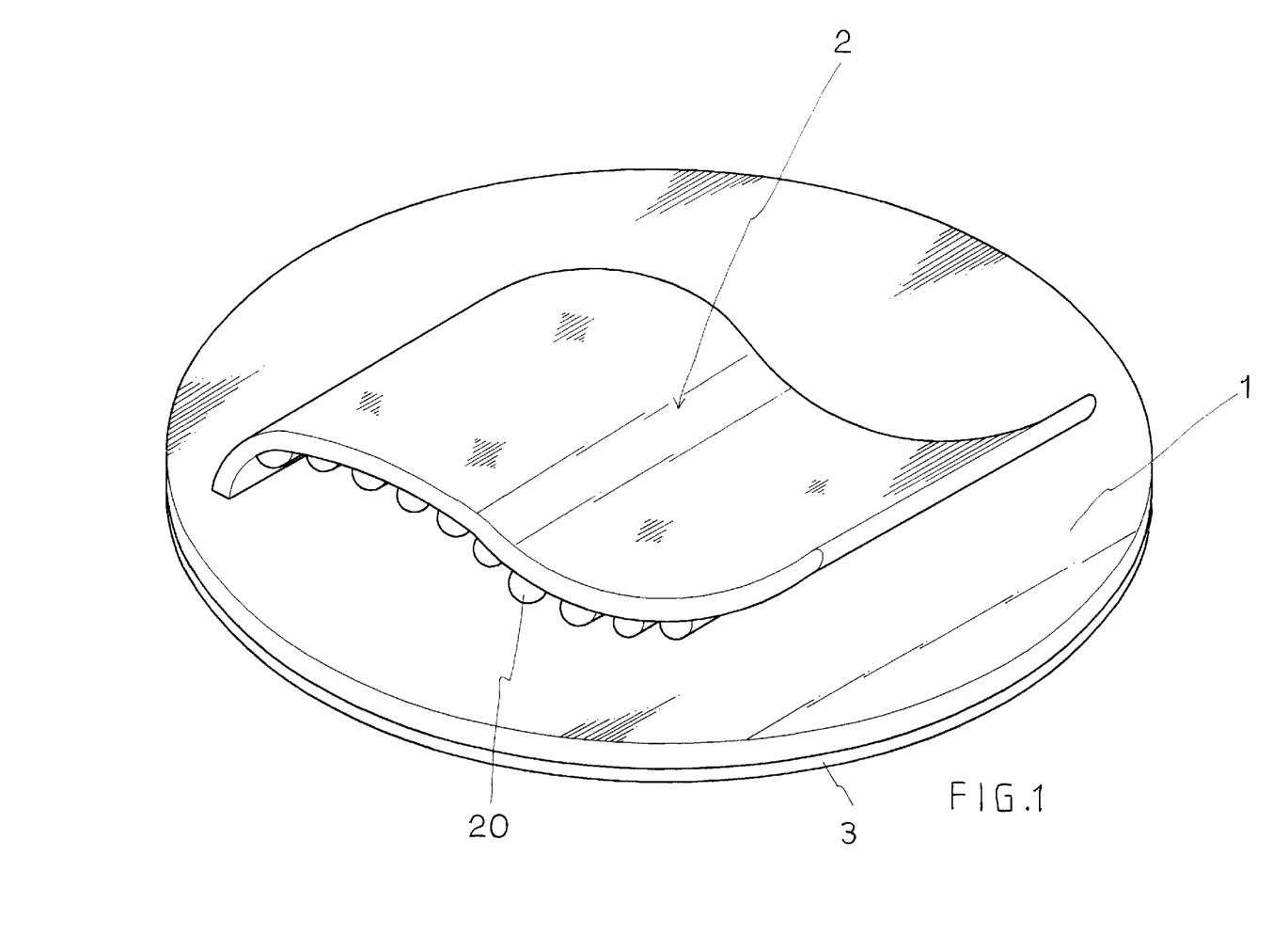
FIG. 1 is a perspective view of a spoon holder device of a first preferred embodiment in accordance with the present invention.

Referring to FIG. 1, a first spoon holder device comprises a seat 1, an adhesive layer 3 adhered on a bottom portion of the seat 1, and a curved clamp plate 2 disposed on a top portion of the seat 1. One end of the curved clamp plate 2 is attached to the seat 1. A plurality of block rods 20 are disposed on the curved clamp plate 2 in parallel. A spacing is defined between the seat 1 and the curved clamp plate 2.

Figure 2:
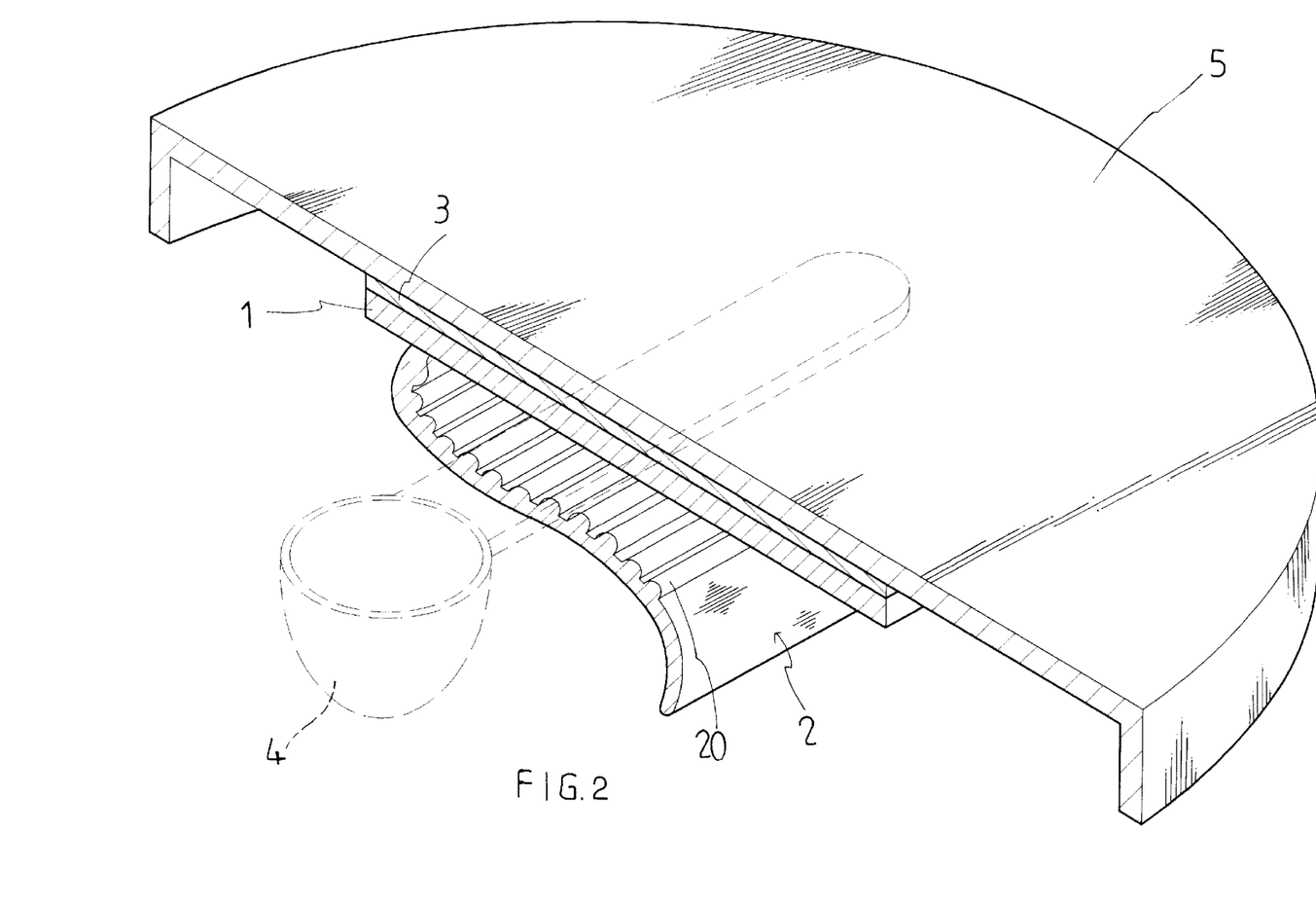
FIG. 2 is a partially sectional view of a spoon holder device of a first preferred embodiment while the spoon holder device holds a spoon.
Figure 3:
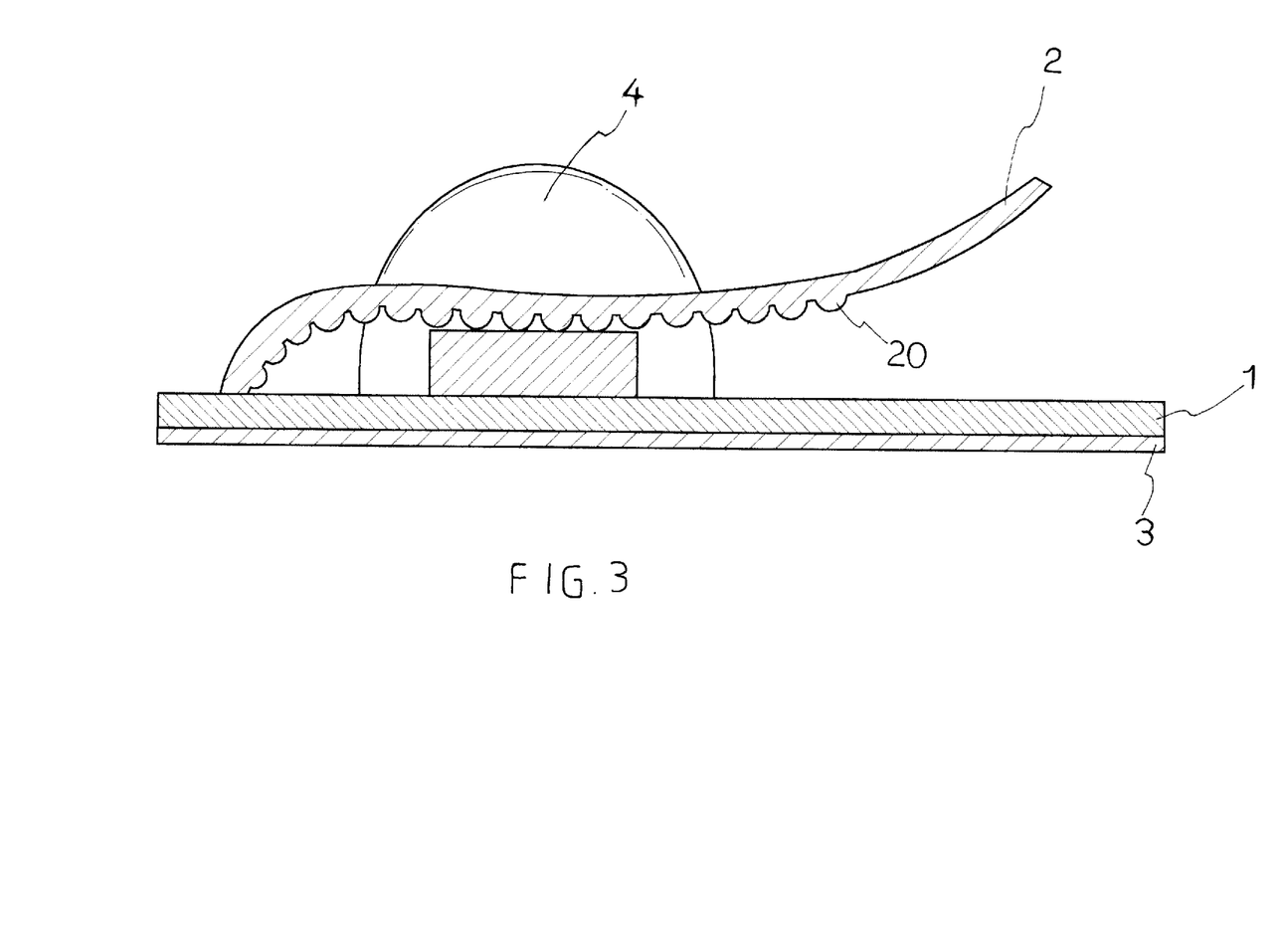
FIG. 3 is a sectional view of FIG. 2.

Referring to FIGS. 2 and 3, a spoon 4 is inserted in the spacing between the seat 1 and the curved clamp plate 2. Thus the seat 1 and the block rods 20 clamp the spoon 4 stably. The adhesive layer 3 is adhered on a can cover 5.

Figure 4:
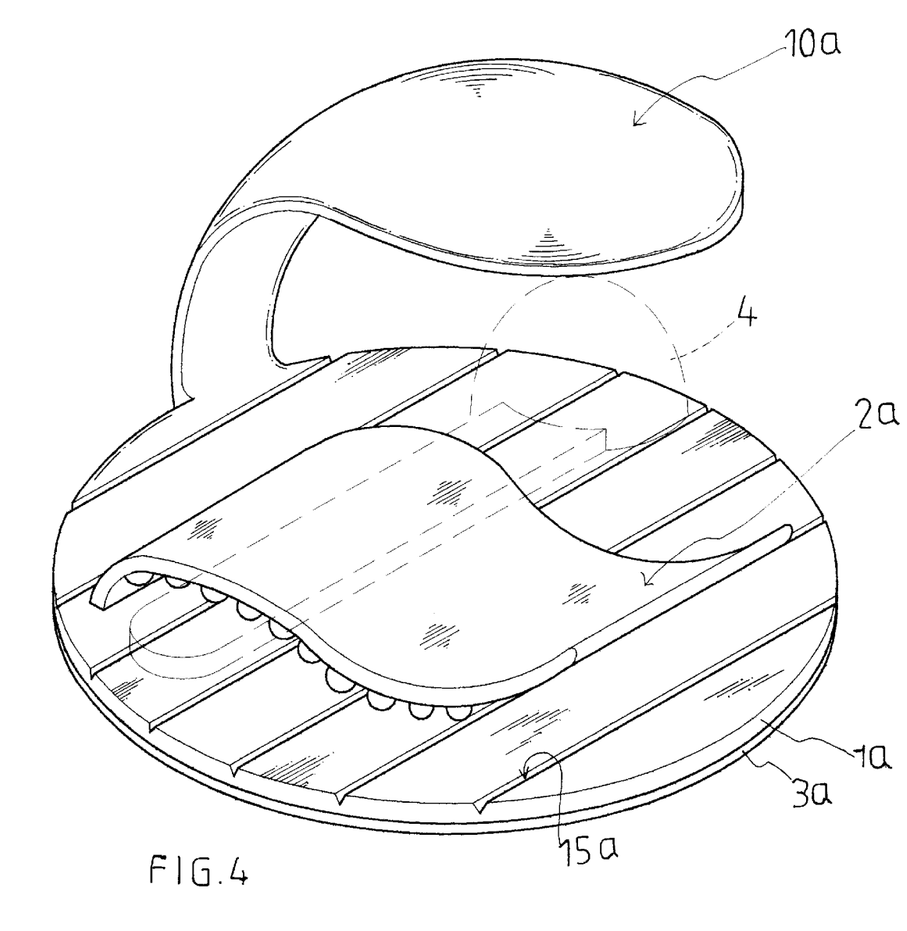
FIG. 4 is a perspective view of a spoon holder device of a second preferred embodiment in accordance with the present invention.
Figure 5:
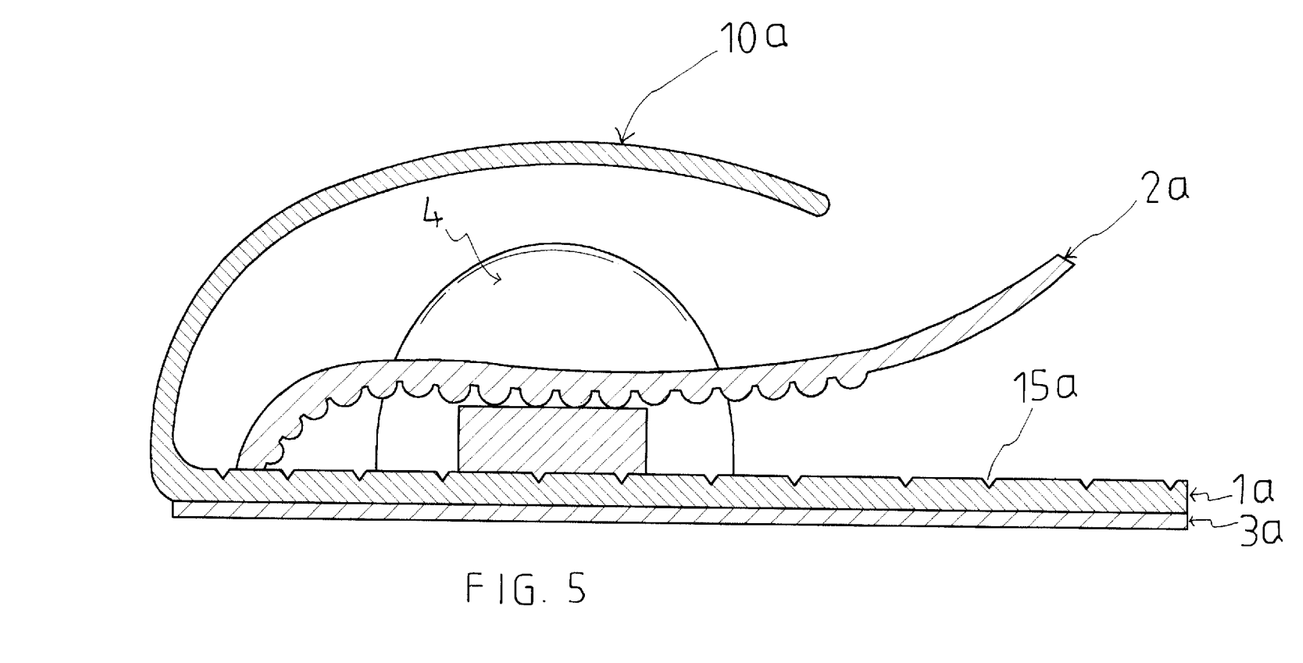
FIG. 5 is a sectional view of FIG. 4.

Referring to FIGS. 4 and 5, a second spoon holder device comprises a seat 1a, an adhesive layer 3a adhered on a bottom portion of the seat 1a, and a curved clamp plate 2a disposed on a top portion of the seat 1a. One end of the curved clamp plate 2a is attached to the seat 1a. A plurality of block rods 20a are disposed on the curved clamp plate 2a in parallel. A spacing is defined between the seat 1a and the curved clamp plate 2a. A spoon 4 is inserted in the spacing between the seat 1a and the curved clamp plate 2a. A dust-resisting casing 10a extends upward from the seat 1a. The dust-resisting casing 10a covers a head portion of the spoon 4. The seat 1a has a plurality of parallel grooves 15a.

Figure 6:
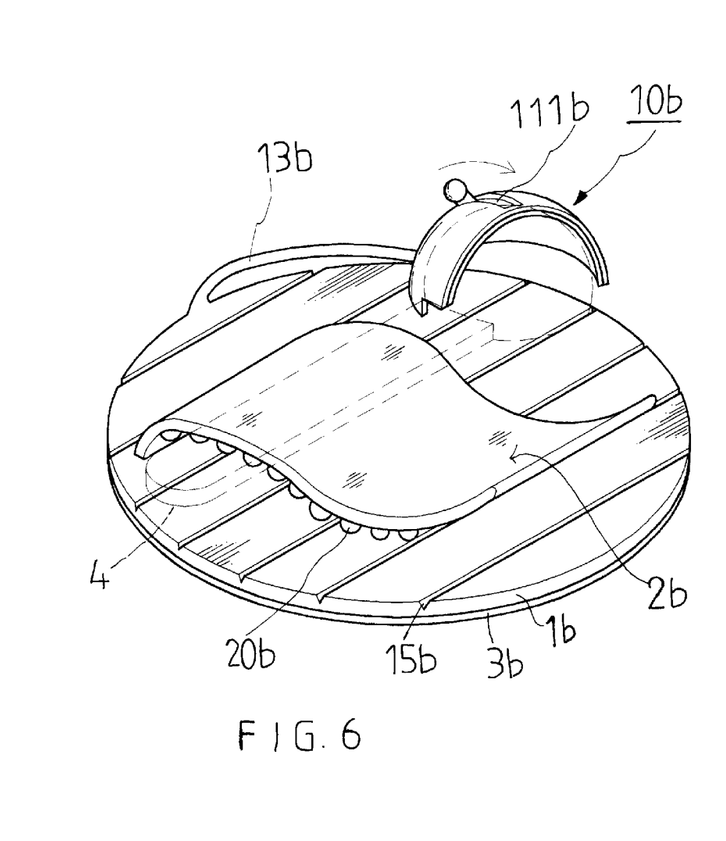
FIG. 6 is a perspective view of a spoon holder device of a third preferred embodiment in accordance with the present invention.
Figure 6A:
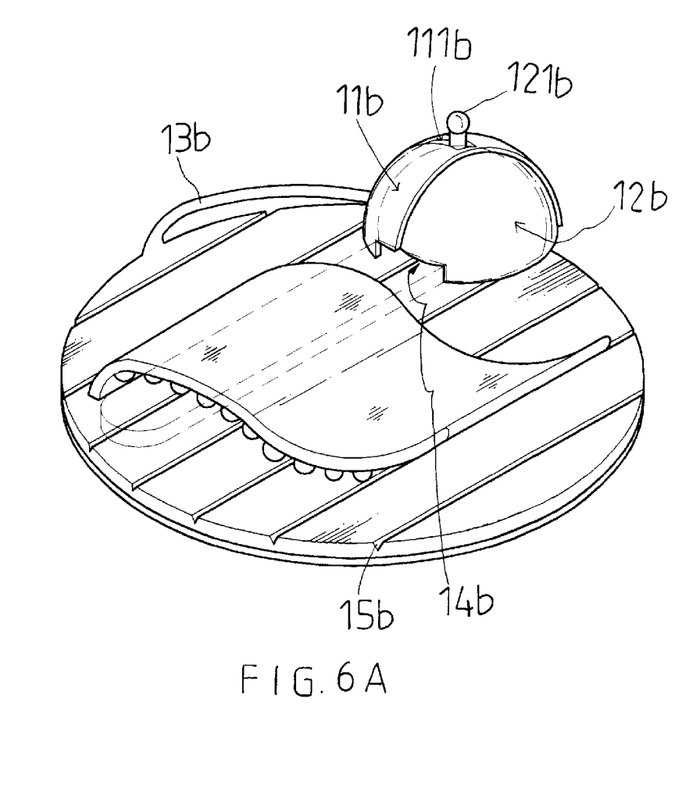
FIG. 6A is a perspective view of a spoon holder device of a third preferred embodiment while the spoon holder device holds a spoon.
Figure 7:
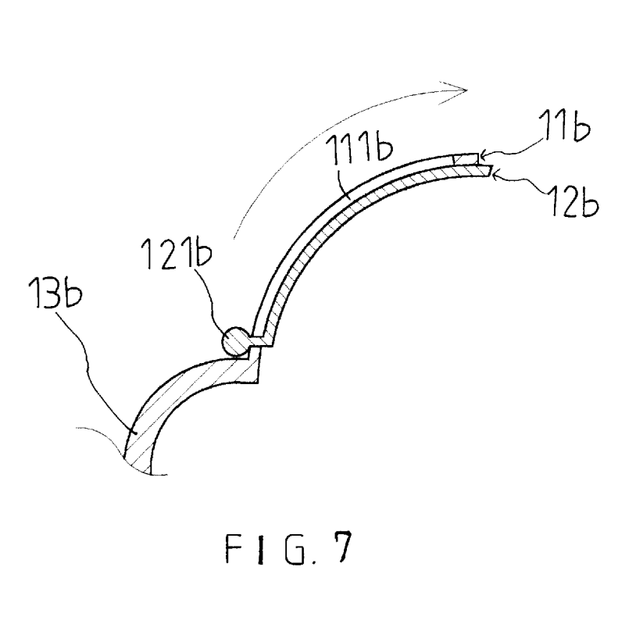
FIG. 7 is a sectional view of a dust-resisting casing.
Figure 7A:
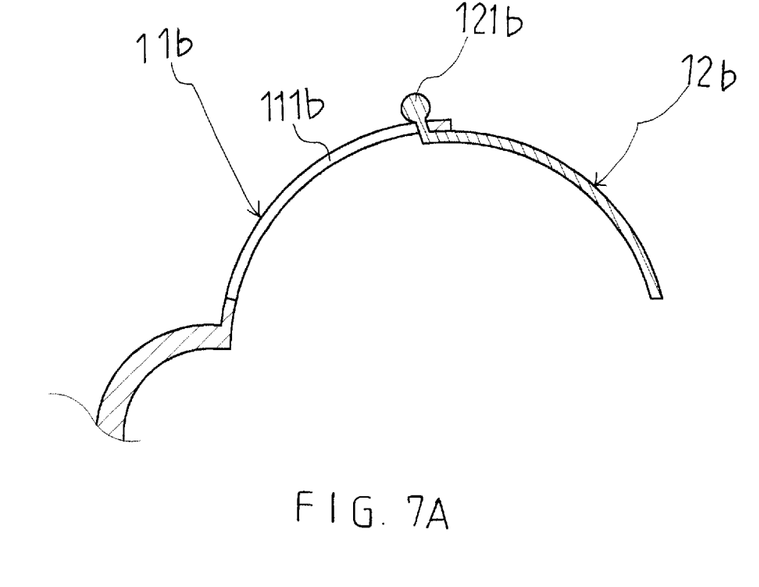
Figure 8:
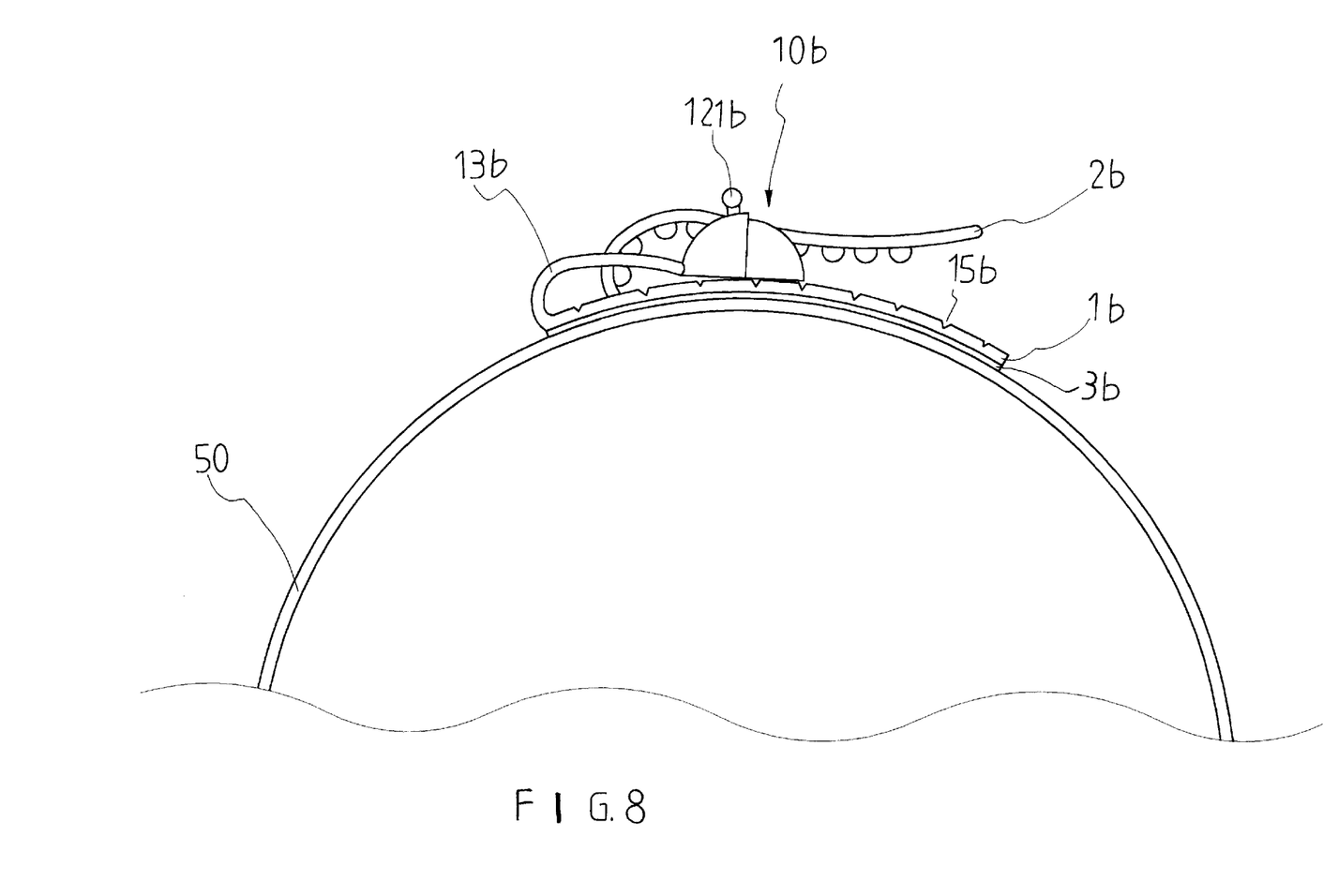
FIG. 8 is a schematic view illustrating a spoon holder device of a third preferred embodiment holding a spoon on an outer periphery of a powdered milk can.

Referring to FIGS. 6 to 8, a third spoon holder device comprises a seat 1b, an adhesive layer 3b adhered on a bottom portion of the seat 1b, and a curved clamp plate 2b disposed on a top portion of the seat 1b. One end of the curved clamp plate 2b is attached to the seat 1b. A plurality of block rods 20b are disposed on the curved clamp plate 2b in parallel. A spacing is defined between the seat 1b and the curved clamp plate 2b. A spoon 4 is inserted in the spacing between the seat 1b and the curved clamp plate 2b. A dust-resisting casing 10b extends upward from the seat 1b. The dust-resisting casing 10b covers a head portion of the spoon 4. The seat 1b has a plurality of parallel grooves 15b. An extended rod 13b extends from the seat 1b. The dust-resisting casing 10b has a movable casing 12b and an outer casing 11b surrounding the movable casing 12b. The movable casing 12b is disposed on the seat 1b. A first end of the outer casing 11b is disposed on the seat 1b. A second end of the outer casing 11b is disposed on a distal end of the extended rod 13b. A push bar 121b is disposed on the movable casing 12b. A slot 111b is formed on the outer casing 11b to receive the push bar 121b. The push bar 121b can be moved in the slot 111b. The movable casing 12b receives a head portion of the spoon 4. The The seat 1b has a plurality of parallel grooves 15b so that the seat 1b is flexible. The adhesive layer 3b is adhered on an outer periphery of a can 50 (as shown in FIG. 8).

The invention is not limited to the above embodiment but various modification thereof may be made. Further, various changes in form and detail may be made without departing from the scope of the invention.

I claim:

1. A spoon holder device comprising:

a seat, an adhesive layer adhered on a bottom portion of the seat, a curved clamp plate disposed on a top portion of the seat, one end of the curved clamp plate attached to the seat, a plurality of block rods disposed on the curved clamp plate in parallel, a spacing defined between the seat and the curved clamp plate, a dust-resisting casing extending upward from the seat, an extended rod extending from the seat, the dust-resisting casing having a movable casing and an outer casing surrounding the movable casing, the movable casing disposed on the seat, a first end of the outer casing disposed on the seat, a second end of the outer casing disposed on a distal end of the extended rod, a push bar disposed on the movable casing, and a slot formed on the outer casing to receive the push bar.

* * * * *